United States Patent [19]
Schreiber

[11] Patent Number: 5,403,054
[45] Date of Patent: Apr. 4, 1995

[54] PICK-UP TOOL

[76] Inventor: Dale A. Schreiber, 5821 Victor Pike, Bloomington, Ind. 47403

[21] Appl. No.: 228,885

[22] Filed: Apr. 18, 1994

[51] Int. Cl.⁶ .......................... B25J 1/00; B25J 15/12
[52] U.S. Cl. .................... 294/19.1; 294/100
[58] Field of Search ............. 294/8.5, 11, 19.1, 19.3, 294/22, 50.8, 99.1, 100, 115, 116

[56] References Cited

U.S. PATENT DOCUMENTS

| | | | |
|---|---|---|---|
| 572,564 | 12/1896 | Owen | 294/100 |
| 933,753 | 9/1909 | Hanger | 294/100 X |
| 1,703,112 | 2/1929 | Kyser et al. | 294/100 |
| 2,204,734 | 6/1940 | Sarnecky | 294/100 |
| 2,794,667 | 6/1957 | Bissitt | 294/100 X |
| 3,467,116 | 9/1969 | Ringewaldt | 294/100 X |
| 3,527,492 | 9/1970 | Hollis | 294/19.1 |
| 3,576,342 | 4/1971 | Page | 294/100 X |
| 4,039,216 | 8/1977 | Soos | 294/19.1 |
| 4,575,143 | 3/1986 | Nast | 294/100 X |
| 4,962,957 | 10/1990 | Traber | 294/19.1 |

*Primary Examiner*—Johnny D. Cherry
*Attorney, Agent, or Firm*—Plews & Shadley

[57] ABSTRACT

A pick-up tool is disclosed for picking up, moving, and releasing a variety of objects through the use of a single hand. A spring wire, formed into a crossing loop, is drawn through a bearing with the ends of the loop grasping the object in a pincers action. The loop is attached to a guide that slides along a shaft. A cord, attached to the guide, is pulled by the action of a rod that is rotatably disposed in a handle attached at an oblique angle to the shaft.

11 Claims, 3 Drawing Sheets

PICK-UP TOOL

BACKGROUND OF THE INVENTION

1. Field of the Invention

The present invention generally relates to tools for picking up objects, and more particularly concerns tools which are capable of picking up a wide variety of small and medium size objects, such as are commonly encountered during building and yard maintenance and litter removal, and which may be operated with the efforts of a single hand.

2. Description of the Prior Art

The array of tools that may be used to pick-up litter and other objects ranges from basic tools such as a stick with a nail in the end to more complex devices having a number of moving parts, often with an actuable jaw. Pick-up tools without moving parts may be inexpensive and simple to produce, and also lightweight and therefore suitable for extended use of without fatigue. However, such simple tools frequently require the use two hands, that is, a first hand uses the tool to pick-up an object, while the second hand must be used to remove the object from the tool. Such a two-handed procedure is both awkward and inefficient, and may require the use of gloves. Complex devices having actuable jaws may eliminate the need to use a second hand, by using the first hand to open the jaw, releasing the object. Unfortunately, complex pick-up tools may be difficult to use for extended periods of time due to their weight and operator fatigue. In addition, complex devices may be expensive to produce and hard to service.

A number of pick-up tools are presently available, for instance, the devices of U.S. Pat. Nos. 572,564, 1,703,112, 3,467,116, 3,576,342, and 4,575,143.

Despite the availability of such devices, there exists a need in the art for a pick-up tool that is capable of picking up, moving, and releasing a wide variety of objects, through the use of a single hand, yet is inexpensive, lightweight, and easy to use for extended periods of time.

SUMMARY OF THE INVENTION

In order to aid in the understanding of the present invention, it can be stated in essentially summary form that it is directed to a pick-up tool that is capable of picking up, moving, and releasing objects of various sizes, shapes and weights, yet is capable of being operated by one hand.

It is an object of the present invention to provide a pick-up tool that is capable of picking up objects of various sizes, shapes and weights.

It is another object of the present invention to provide a pick-up tool that is capable of moving objects of various sizes, shapes and weights after the objects have been picked up.

It is another object of the present invention to provide a pick-up tool that is capable of releasing objects of various sizes, shapes and weights after the objects have been picked up.

It is another object of the present invention to provide a pick-up tool that is capable of being operated through the use of a single hand.

It is another object of the present invention to provide a pick-up tool that is capable of being repeatedly operated with a minimum amount of operator fatigue.

It is another object of the present invention to provide a pick-up tool that is capable of rapid and easy disassembly, cleaning and reassembly.

It is still another object of the present invention to provide a pick-up tool that is inexpensive to produce.

It is yet another object of the present invention to provide a pick-up tool of relatively simple construction with a minimum of components.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
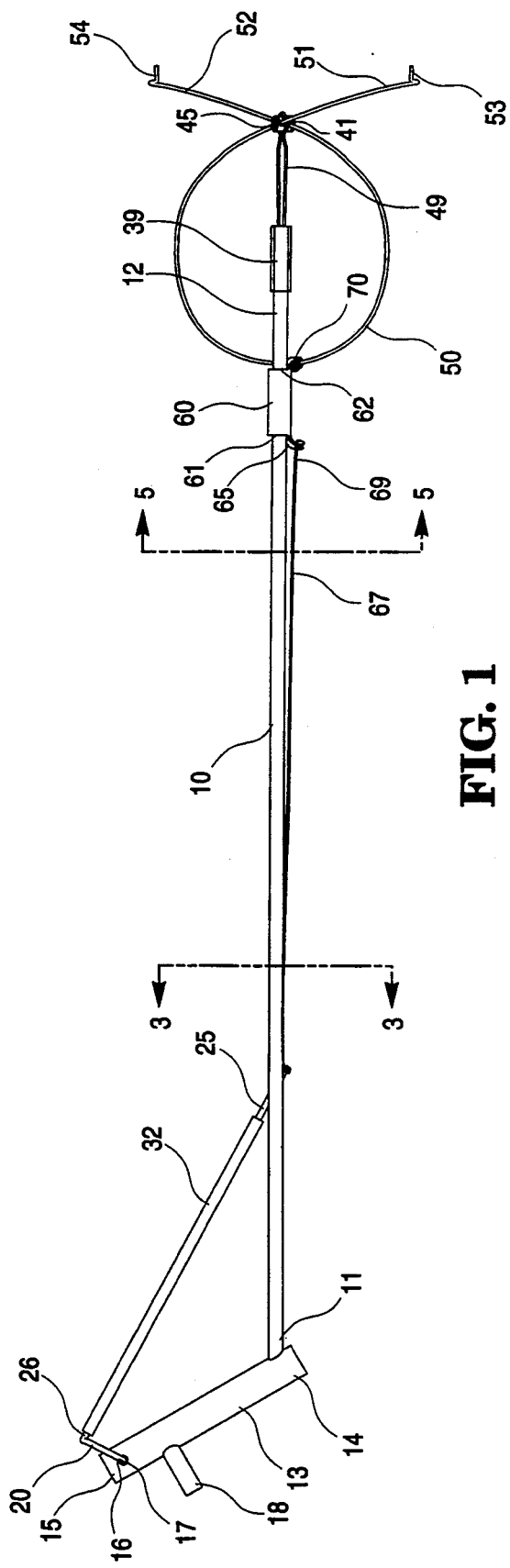
FIG. 1 is a side view of a pick-up tool representing the present invention in the unactuated, open position.
Figure 2:
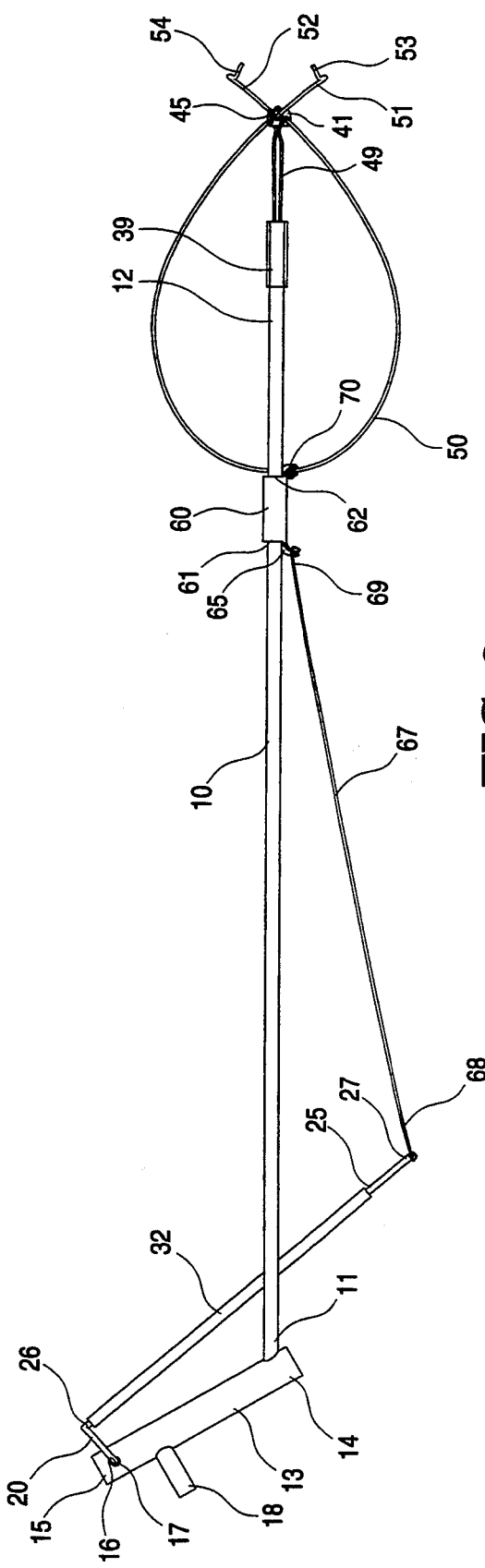
FIG. 2 is a side view of a pick-up tool representing the present invention in the actuated, closed position.

Referring now to the drawings for a detailed description of the present invention, reference is first made to FIGS. 1 and 2, depicting a cylindrical shaft 10 having shaft first end 11 and shaft second end 12. Generally cylindrical handle 13 having handle first end 14, handle second end 15, and handle hole 16 is attached to shaft 10 so that handle first end 14 is proximate to shaft first end 11; the axis of handle 13 is disposed at an angle of approximately 116 degrees with respect to the axis of shaft 10. Handle hole 16 is disposed normal to the plane defined by the axis of handle 13 and the axis of shaft 10, and is proximate to handle second end 15. Cylindrical handle bushing 17 is disposed within handle hole 16, and peg 18 is attached to handle 13 proximate to handle second end 15 so that peg 18 is disposed in the plane defined by the axis of handle 13 and the axis of shaft 10, normal to the axis of handle 13, and generally opposed to shaft 10.

Figure 3:
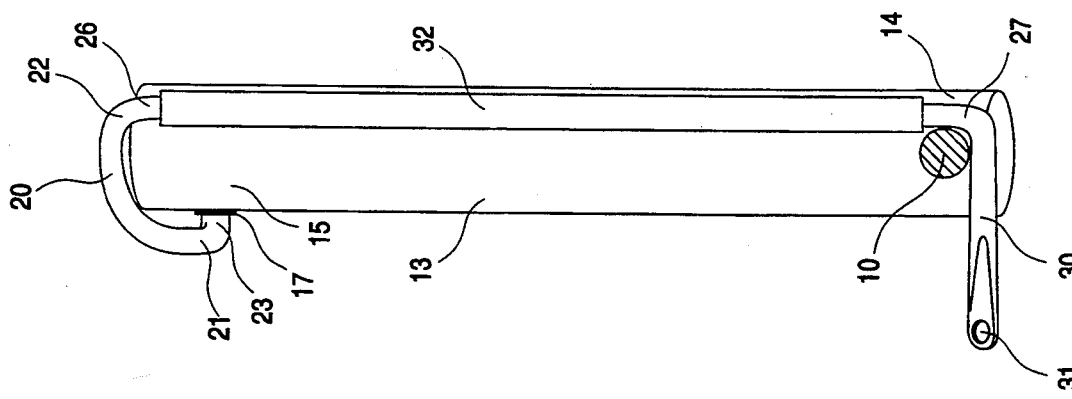
FIG. 3 is a detail section view taken along line 3—3 of FIG. 1, shown without the cord.

As depicted in FIGS. 1, 2, and 3, generally C-shaped hook 20, having hook first end 21 and hook second end 22, is integrally formed with straight hook rod 23 at hook first end 21 so that hook 20 and hook rod 23 are coplanar. Hook rod 23 is rotatably disposed within handle bushing 17 so that hook 20 is positioned generally opposite to peg 18. Generally straight cylindrical rod central portion 25, having rod central portion first end 26 and rod central portion second end 27, is integrally formed with said hook 20. Rod central portion first end 26 is attached to hook second end 22 so that rod central portion 25 is disposed normal to the plane of hook 20, parallel to the plane defined by the axis of shaft 10 and the axis of handle 13, and is capable of sliding contact with and along shaft 10 opposite to the side of handle 13 where hook 20 emerges from handle bushing 17. Generally straight rod end portion 30, having rod end hole 31, is integrally formed with rod central portion 25 so that rod end portion 30 is attached to rod central portion second end 27. Rod end portion 30 is disposed perpendicular to rod central portion 25, parallel to and projecting oppositely from hook rod 23, and rod end hole 31 is disposed normally through rod end portion 30 and distal to rod central portion 25. Cylindrical sleeve 32 is disposed around rod central portion 25, with the interior diameter of sleeve 32 chosen to be slightly greater than the exterior diameter of rod central portion 25, permitting sleeve 32 to rotate with respect to rod central portion 25.

Figure 4:
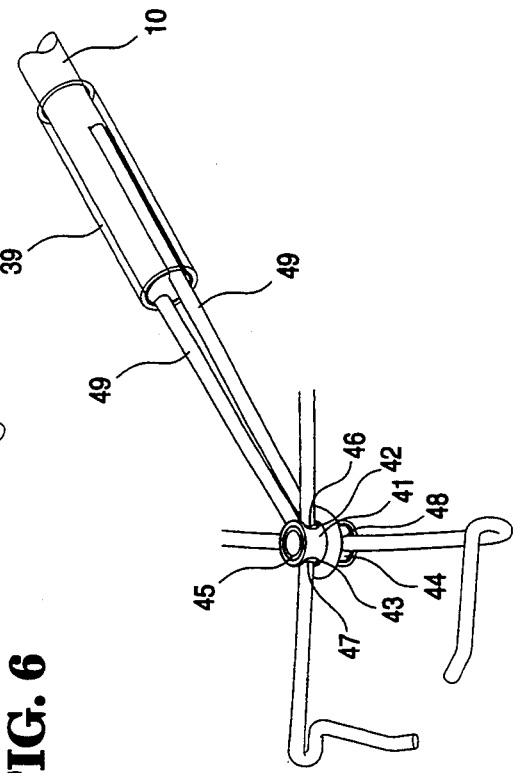
FIG. 4 is a detail perspective view of the bearing portion of a pick-up tool representing the present invention.

Referring to FIG. 4, outer cylinder 41 has elongated first top aperture 42, opposing, elongated second top aperture 43, elongated first bottom aperture 44 and an opposing, elongated second bottom aperture, not shown. Inner cylinder 45 has a first top inner cylinder hole 46, opposing second top inner cylinder hole 47, first bottom inner cylinder hole 48, and an opposing second bottom inner cylinder hole, not shown. Inner cylinder 45 is rotatably disposed within outer cylinder 41 so that first top aperture 42 is located proximate to first top inner cylinder hole 46, second top aperture 43 is located proximate to second top inner cylinder hole 47, first bottom aperture 44 is located proximate to first bottom inner cylinder hole 48, and the second bottom aperture is located proximate to the second bottom inner cylinder hole. Outer cylinder 41 is attached to cylinder arms 49, and cylinder arms 49 are attached to shaft 10 by transparent collar 39.

Figure 5:
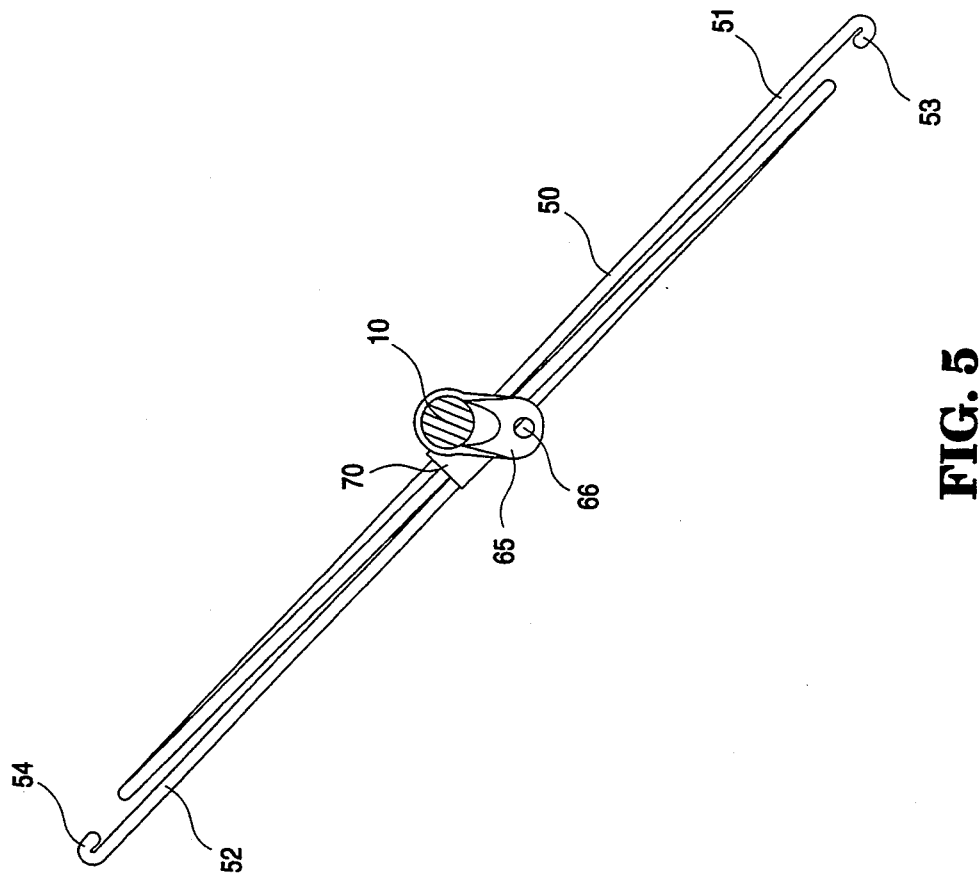
FIG. 5 is a detail section view taken along line 5—5 of FIG. 1, shown without the cord.

As shown in FIGS. 1, 2, and 5, steel spring wire 50, having spring wire first end 51 and spring wire second end 52, is bent to form a loop. Spring wire first and second ends 51 and 52 cross each other within inner cylinder 45, and project away from shaft second end 12. First gripping end 53 is attached to spring wire first end 51, and second gripping end 54 is similarly attached to spring wire second end 52. The transverse dimensions of first top aperture 42, second top aperture 43, first bottom aperture 44 and the second bottom aperture are chosen to be slightly greater than the diameter of spring wire 50, and similarly, the dimensions of first top inner cylinder hole 46, second top inner cylinder hole 47, first bottom inner cylinder hole 48, and the second bottom inner cylinder hole are chosen to be slightly greater than the diameter of spring wire 50. In this way, spring wire first end 51 may be slidably disposed through first top aperture 42, first top inner cylinder hole 46, second top inner cylinder hole 47 and second top aperture 43. Also, spring wire second end 52 may be slidably disposed through first bottom aperture 44, first bottom inner cylinder hole 48, the second bottom inner cylinder hole and the second bottom aperture.

As depicted in FIGS. 1, 2 and 5, generally cylindrical guide 60, having guide first end 61 and guide second end 62, is slidably disposed surrounding shaft 10 between handle 13 and bearing means so that guide first end 61 is proximate to handle 13. Guide tab 65, having guide tab hole 66, is attached to guide first end 61 so that the axis of guide tab hole 66 is generally parallel to shaft 10 and is coplanar with shaft 10 and said handle 13, with guide tab hole 66 positioned generally opposing handle 13. Cord 67, having cord first end 68 and cord second end 69, is disposed with cord first end 68 attached through rod end hole 31 and cord second end 69 attached through guide tab hole 66. Attachment finger 70, integral with guide 60, is attached proximate to guide second end 62 so that attachment finger 70 is disposed around spring wire 50 and the plane defined by the loop of spring wire 50 forms an angle of approximately 45 degrees with respect to the plane defined by shaft 10 and handle 13.

Figure 6:
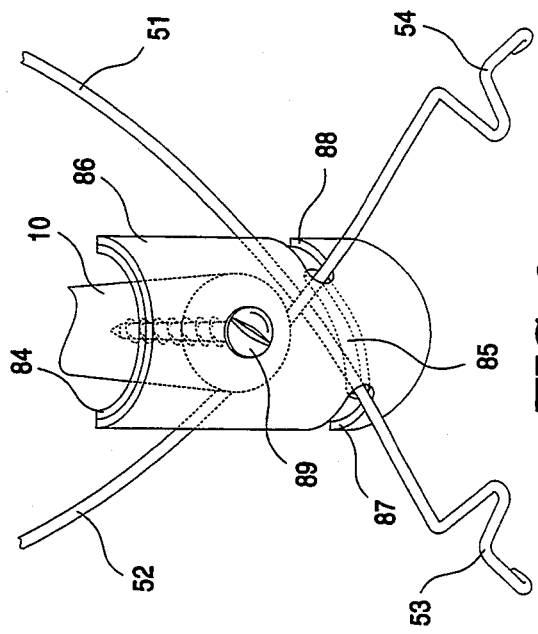
FIG. 6 is a detail perspective view of the bearing portion of a pick-up tool representing a second embodiment of the present invention.

Referring now to FIG. 6, in a second embodiment of the present invention, arcuate first plate 84 has angled, elongated slot 85, and arcuate second plate 86 has first notch 87 and second notch 88. First notch 87 and second notch 88 are disposed at opposite sides of second plate 86 so that first notch 87 is offset with respect to second notch 88. First and second plates 84 and 86 are removably attached to shaft second end 12 by screw 89 so that first plate 84 is disposed between second plate 86 and shaft second end 12, slot 85 is disposed between first and second notches 87 and 88, and first and second plates 84 and 86 are concave with respect to handle 13. Spring wire 50 is disposed so that spring wire first and second ends 51 and 52 cross each other adjacent to the concave side of first plate 84, with first and second gripping ends 53 and 54 shown in an alternative configuration to the previous embodiment. The transverse dimension of slot 85 is chosen to be slightly greater than the diameter of spring wire 50, and similarly, the dimensions of each of first and second notches 87 and 88 are chosen to be slightly greater than the diameter of spring wire 50. In this way, spring wire first end 51 may be slidably disposed through first notch 87 and slot 85, and spring wire second end 52 may be slidably disposed through second notch 88 and slot 85.

Figure 7:
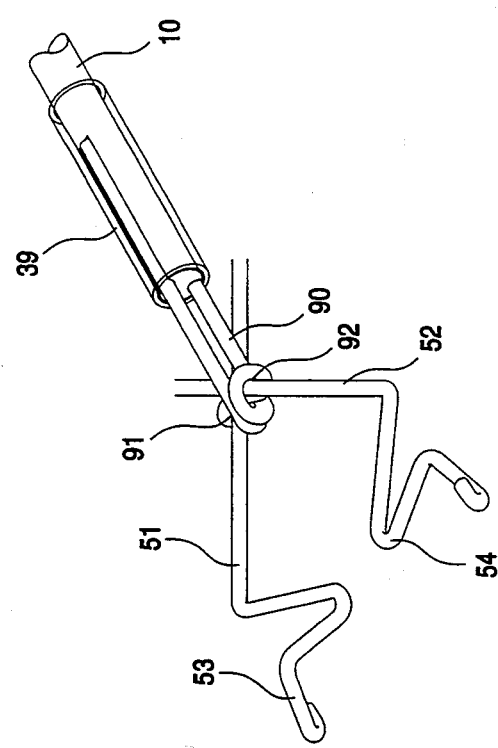
FIG. 7 is a detail perspective view of the bearing portion of a pick-up tool representing a third embodiment of the present invention.

As depicted in FIG. 7, in a third embodiment of the present invention, wire bearing 90, formed from wire bent to have wire bearing first opening 91 and wire bearing second opening 92, is attached to shaft 10 by collar 39. Spring wire first end 51 and spring wire second end 52 are slidably disposed through wire bearing 90 at wire bearing first opening 91 and wire bearing second opening 92, respectively.

In use, the present invention is held and operated by one hand placed around handle 13 and rod central portion 25, with peg 18 between thumb and forefinger, with the present invention being in the configuration shown in FIG. 1. As shown in FIG. 2, by closing the hand, rod central portion 25 rotates towards handle 13 and slidingly contacts shaft 10, thereby pulling cord 67 and guide 60 toward handle 13. In this way, the loop of spring wire 50 is further biased, being pulled through outer cylinder 41 and inner cylinder 45. The loop of spring wire 50 is stretched, causing first and second gripping ends 53 and 54 to be pulled together as pincers towards outer cylinder 41. The relative angle between first and second ends 51 and 52 changes as the loop of spring wire 50 is stretched, with inner cylinder 45 rotating with respect to outer cylinder 41 so that first and second ends 51 and 52 move laterally through each of first top aperture 42, second top aperture 43, first bottom aperture 44 and the second bottom aperture. The object to be picked up is held between first and second gripping ends 53 and 54. The operator may then move the object, and thereafter release the object by opening the hand, causing the present invention to return to the open position of FIG. 1 through the action of the biasing of spring wire 50. By virtue of the plane defined by the loop of spring wire 50 forming an angle of approximately 45 degrees with respect to the plane defined by shaft 10 and handle 13, the operator may easily pick up objects oriented at various angles by a slight rotation of the present invention about the axis of shaft 10. The angle of approximately 116 degrees between the axis of handle 13 and shaft 10 has been found to facilitate repeated use of the present invention with a minimum of fatigue.

The present invention having been described in its preferred embodiments, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Pick-up tool, comprising:
    a shaft having a shaft first end and a shaft second end;
    a generally cylindrical handle having a handle first end, a handle second end, and a handle hole, said handle attached to said shaft so that said handle first end is proximate to said shaft first end, the axis of said handle is disposed at an obtuse first angle with respect to the axis of said shaft, and said handle hole is disposed normal to the plane defined by the axis of said handle and the axis of said shaft and proximate to said handle second end;
    a peg attached to said handle proximate to said handle second end so that said peg is disposed in the plane defined by the axis of said handle and the axis of said shaft, normal to the axis of said handle, and generally opposed to said shaft;
    a generally C-shaped hook having a hook first end and a hook second end;
    a straight hook rod attached to said hook first end so that said hook and said hook rod are coplanar, said hook rod rotatably disposed within said rod hole so that said hook is positioned generally opposed to said peg;
    a generally straight cylindrical rod central portion having a rod central portion first end and a rod central portion second end, said rod central portion first end attached to said hook second end so that said rod central portion is disposed normal to the plane of said hook, parallel to the plane defined by the axis of said handle and the axis of said shaft, generally opposing said handle hole, and slidingly contacts said shaft;
    a generally straight rod end portion attached to said rod central portion second end so that said rod end portion is disposed perpendicular to said rod central portion and parallel to and projecting opposite said hook rod;
    bearing means, attached proximate to said shaft second end;
    a spring wire having a spring wire first end and a spring wire second end, said spring wire slidably disposed through said bearing means so that said spring wire forms a loop, said spring wire first and second ends cross each other adjacent to said bearing means and project away from said shaft second end;
    a guide having a guide first end and a guide second end, said guide slidably disposed surrounding said shaft between said handle and said bearing means so that said guide first end is proximate to said handle;
    a guide tab attached to said guide first end, disposed generally coplanar with said shaft and said handle and opposing said handle;
    a cord connected between said rod end portion and said guide tab; and
    an attachment finger attached proximate to said guide second end so that said attachment finger is disposed around said spring wire and the plane defined by said loop forms a second angle with respect to the plane defined by the axis of said shaft and the axis of said handle.

2. Pick-up tool as defined in claim 1, wherein said first angle is 116 degrees and said second angle is 45 degrees.

3. Pick-up tool as defined in claim 1, further comprising a sleeve disposed around said rod central portion, the interior diameter of said sleeve slightly greater than the exterior diameter of said rod central portion.

4. Pick-up tool as defined in claim 1, further comprising:
    a first gripping end attached to said spring wire first end; and
    a second gripping end attached to said spring wire second end.

5. Pick-up tool as defined in claim 1, wherein said bearing means comprises:
    an arcuate first plate having an elongated slot, the transverse dimension of said slot slightly greater than the diameter of said spring wire;
    an arcuate second plate having a first notch and a second notch, the dimensions of each of said first and second notches slightly greater than the diameter of said spring wire, said first notch and said second notch disposed at opposite sides of said second plate so that said first notch is offset with respect to said second notch; and
    means for attaching said first and second plates to said shaft second end so that said first plate is disposed between said second plate and said shaft second end, said slot is disposed between said first and second notches, said first and second plates are concave with respect to said handle, said spring wire first end is slidably disposed through said first notch and said slot, and said spring wire second end is slidably disposed through said second notch and said slot.

6. Pick-up tool as defined in claim 1, wherein said bearing means comprises:
    a wire bearing having a wire bearing first opening and a wire bearing second opening; and
    means for attaching said wire bearing to said shaft second end so that said spring wire first end is slidably disposed through said wire bearing first end and said spring wire second end is slidably disposed through said wire bearing second end.

7. Pick-up tool as defined in claim 1, wherein said bearing means comprises:
    an outer cylinder having an elongated first top aperture, an elongated second top aperture, an elongated first bottom aperture, and an elongated second bottom aperture, said first top aperture disposed generally opposing said second top aperture, and said first bottom aperture disposed generally opposing said second bottom aperture;

an inner cylinder having a first top inner cylinder hole, a second top inner cylinder hole, a first bottom inner cylinder hole, and a second bottom inner cylinder hole, said inner cylinder rotatably disposed within said outer cylinder so that said first top aperture is located proximate to said first top inner cylinder hole, said second top aperture is located proximate to said second top inner cylinder hole, said first bottom aperture is located proximate to said first bottom inner cylinder hole, and said second bottom aperture is located proximate to said second bottom inner cylinder hole; and means for attaching said outer cylinder to said shaft second end so that said spring wire first end is slidably disposed through said first top aperture, said first top inner cylinder hole, said second top inner cylinder hole, and said second top aperture, and said spring wire second end is slidably disposed through said first bottom aperture, said first bottom inner cylinder hole, said second bottom inner cylinder hole, and said second bottom aperture.

8. Pick-up tool, comprising:

a shaft having a shaft first end and a shaft second end;

a generally cylindrical handle having a handle first end, a handle second end, and a handle hole, said handle attached to said shaft so that said handle first end is proximate to said shaft first end, the axis of said handle is disposed at an angle of approximately 116 degrees with respect to the axis of said shaft, and said handle hole is disposed normal to the plane defined by the axis of said handle and the axis of said shaft and proximate to said handle second end;

a cylindrical handle bushing disposed within said handle hole;

a peg, attached to said handle proximate to said handle second end so that said peg is disposed in the plane defined by the axis of said handle and the axis of said shaft, normal to the axis of said handle, and generally opposed to said shaft;

a generally C-shaped hook having a hook first end and a hook second end;

a straight hook rod attached to said hook first end so that said hook and said hook rod are coplanar, said hook rod rotatably disposed within said handle bushing so that said hook is positioned generally opposed to said peg;

a generally straight cylindrical rod central portion having a rod central portion first end and a rod central portion second end, said rod central portion first end attached to said hook second end so that said rod central portion is disposed normal to the plane of said hook, parallel to the plane defined by the axis of said handle and the axis of said shaft, generally opposing said handle hole, and slidingly contacts said shaft;

a generally straight rod end portion having a rod end hole, said rod end portion attached to said rod central portion second end so that said rod end portion is disposed perpendicular to said rod central portion and parallel to and projecting opposite said hook rod, and said rod end hole is disposed normally through said rod end portion and distal to said rod central portion;

a cylindrical sleeve disposed around said rod central portion, the interior diameter of said sleeve slightly greater than the exterior diameter of said rod central portion;

bearing means, attached proximate to said shaft second end;

a spring wire having a spring wire first end and a spring wire second end, said spring wire slidably disposed through said bearing means so that said spring wire forms a loop, said spring wire first and second ends cross each other adjacent to said bearing means and project away from said shaft second end;

a first gripping end attached to said spring wire first end;

a second gripping end attached to said spring wire second end;

a guide having a cylindrical guide inner surface, a guide first end and a guide second end, the diameter of said guide inner surface slightly greater than the exterior diameter of said shaft, said guide slidably disposed surrounding said shaft between said handle and said bearing means so that said guide first end is proximate to said handle;

a guide tab having a guide tab hole, said guide tab attached to said guide first end so that the axis of said guide tab hole is generally parallel to said shaft and is coplanar with said shaft and said handle, and said guide tab hole is positioned opposing said handle;

a cord having a cord first end and a cord second end, said cord first end attached through said rod end hole and said cord second end attached through said guide tab hole; and an attachment finger attached proximate to said guide second end so that said attachment finger is disposed around said spring wire and the plane defined by said loop forms an angle of approximately 45 degrees with respect to the plane defined by the axis of said shaft and the axis of said handle.

9. Pick-up tool as defined in claim 8, wherein said bearing means comprises:

an arcuate first plate having an elongated slot, the transverse dimension of said slot slightly greater than the diameter of said spring wire;

an arcuate second plate having a first notch and a second notch, the dimensions of each of said first and second notches slightly greater than the diameter of said spring wire, said first notch and said second notch disposed at opposite sides of said second plate so that said first notch is offset with respect to said second notch; and means for attaching said first and second plates to said shaft second end so that said first plate is disposed between said second plate and said shaft second end, said slot is disposed between said first and second notches, said first and second plates are concave with respect to said handle, said spring wire first end is slidably disposed through said first notch and said slot, and said spring wire second end is slidably disposed through said second notch and said slot.

10. Pick-up tool as defined in claim 8, wherein said bearing means comprises:

a wire bearing having a wire bearing first opening and a wire bearing second opening; and means for attaching said wire bearing to said shaft second end so that said spring wire first end is slidably disposed through said wire bearing first end and said spring wire second end is slidably disposed through said wire bearing second end.

11. Pick-up tool as defined in claim 8, wherein said bearing means comprises:
- an outer cylinder having an elongated first top aperture, an elongated second top aperture, an elongated first bottom aperture, and an elongated second bottom aperture, said first top aperture disposed generally opposing said second top aperture, and said first bottom aperture disposed generally opposing said second bottom aperture;
- an inner cylinder having a first top inner cylinder hole, a second top inner cylinder hole, a first bottom inner cylinder hole, and a second bottom inner cylinder hole, said inner cylinder rotatably disposed within said outer cylinder so that said first top aperture is located proximate to said first top inner cylinder hole, said second top aperture is located proximate to said second top inner cylinder hole, said first bottom aperture is located proximate to said first bottom inner cylinder hole, and said second bottom aperture is located proximate to said second bottom inner cylinder hole; and
- means for attaching said outer cylinder to said shaft second end so that said spring wire first end is slidably disposed through said first top aperture, said first top inner cylinder hole, said second top inner cylinder hole, and said second top aperture, and said spring wire second end is slidably disposed through said first bottom aperture, said first bottom inner cylinder hole, said second bottom inner cylinder hole, and said second bottom aperture.

* * * * *